US012644325B2

(12) United States Patent
Baldreich et al.

(10) Patent No.: US 12,644,325 B2
(45) Date of Patent: Jun. 2, 2026

(54) FURNITURE DRIVE FOR MOVING A FURNITURE PART THAT IS MOVABLY MOUNTED RELATIVE TO A FURNITURE BODY

(71) Applicant: Julius Blum GmbH, Hoechst (AT)

(72) Inventors: Armin Baldreich, Lauterach (AT); Alexander Simon Flogaus, Eriskirch (DE); Andreas Holzapfel, Bregenz (AT); Dominik Hagspiel, Hoechst (AT); Peter Gabel, Meiningen (DE)

(73) Assignee: JULIUS BLUM GMBH, Hoechst (AT)

( * ) Notice: Subject to any disclaimer, the term of this patent is extended or adjusted under 35 U.S.C. 154(b) by 191 days.

(21) Appl. No.: 18/144,987

(22) Filed: May 9, 2023

(65) Prior Publication Data

US 2023/0272655 A1 Aug. 31, 2023

Related U.S. Application Data

(63) Continuation of application No. PCT/AT2021/060410, filed on Nov. 5, 2021.

(30) Foreign Application Priority Data

Nov. 12, 2020 (AT) .............................. A 50979/2020

(51) Int. Cl.
*E05F 1/12* (2006.01)
*E05D 15/40* (2006.01)

(52) U.S. Cl.
CPC ............ *E05F 1/1261* (2013.01); *E05D 15/40* (2013.01); *E05Y 2201/626* (2013.01); (Continued)

(58) Field of Classification Search
CPC ..... E05F 1/1261; E05F 1/1276; E05F 1/1058; E05D 15/40; E05Y 2201/626; (Continued)

(56) References Cited

U.S. PATENT DOCUMENTS 7,240,974 B2 * 7/2007 Hirtsiefer .............. E05D 15/262 312/109
9,506,283 B2 11/2016 Folie
(Continued)

FOREIGN PATENT DOCUMENTS

CN 1863978 A 11/2006
CN 106175199 12/2016
(Continued)

OTHER PUBLICATIONS

International Search Report issued Feb. 24, 2022 in International (PCT) Application No. PCT/AT2021/060410.

*Primary Examiner* — James O Hansen
(74) *Attorney, Agent, or Firm* — Wenderoth, Lind & Ponack, L.L.P.

(57) ABSTRACT

A furniture drive includes a carrier and an actuating arm assembly arranged on the carrier and including a movably-supported actuating arm. The furniture drive also includes a spring device for applying a force to the actuating arm assembly, the spring device being connected to the actuating arm assembly via an engagement location, a transmission mechanism for transmitting a force of the spring device to the actuating arm assembly, and an adjustment device including a rotatably-supported adjustment element. A relative position of the engagement location can be adjusted by a rotation of the adjustment element. The furniture drive further includes an overload safety device configured to couple the adjustment element with the transmission mechanism upon rotation of the adjustment element with torque below a predetermined torque, and to decouple the adjustment element from the transmission mechanism upon rotation of the adjustment element with torque above the predetermined torque.

24 Claims, 6 Drawing Sheets

(52) U.S. Cl.
CPC ..... *E05Y 2800/21* (2013.01); *E05Y 2800/242* (2013.01); *E05Y 2800/266* (2013.01); *E05Y 2800/344* (2013.01); *E05Y 2900/20* (2013.01)

(58) Field of Classification Search
CPC ........... E05Y 2800/21; E05Y 2800/242; E05Y 2800/266; E05Y 2800/344; E05Y 2900/20
USPC .......................................................... 312/327
See application file for complete search history.

(56) References Cited

U.S. PATENT DOCUMENTS

| | | | | |
|---|---|---|---|---|
| 10,487,554 | B2 | 11/2019 | Lubetz et al. | |
| 11,060,337 | B2 | 7/2021 | Sobolewski et al. | |
| 11,525,295 | B2 | 12/2022 | Nordieker et al. | |
| 2008/0121490 | A1* | 5/2008 | Dubach | E05F 5/00 192/17 D |
| 2008/0238276 | A1 | 10/2008 | Migli | |
| 2011/0197639 | A1* | 8/2011 | Hauer | E05D 15/262 70/174 |
| 2013/0333291 | A1 | 12/2013 | Blum | |
| 2015/0361705 | A1 | 12/2015 | Folie | |
| 2017/0204645 | A1 | 7/2017 | Lubetz et al. | |
| 2018/0058123 | A1* | 3/2018 | Salice | E05F 5/02 |
| 2019/0093404 | A1* | 3/2019 | Schmid | E05F 1/1058 |
| 2020/0123827 | A1 | 4/2020 | Sobolewski et al. | |
| 2021/0010311 | A1 | 1/2021 | Nordieker et al. | |

FOREIGN PATENT DOCUMENTS

| | | |
|---|---|---|
| DE | 20 2010 005 934 | 9/2010 |
| EP | 3 708 753 | 9/2020 |
| JP | 60-6076 | 1/1985 |
| JP | 2011-214376 | 10/2011 |
| JP | 2014-506642 | 3/2014 |
| JP | 2016-509143 | 3/2016 |
| JP | 2017-536492 | 12/2017 |
| KR | 10-2135161 | 7/2020 |
| WO | 2018/192819 | 10/2018 |

* cited by examiner

FURNITURE DRIVE FOR MOVING A FURNITURE PART THAT IS MOVABLY MOUNTED RELATIVE TO A FURNITURE BODY

BACKGROUND OF THE INVENTION

The present invention relates to a furniture drive for moving a furniture part movably supported relative to a furniture carcass. The furniture drive comprises:

- a carrier configured to be fixed to a furniture carcass,
- an actuating arm assembly arranged on the carrier, the actuating arm assembly including at least one movably-supported actuating arm for moving the movable furniture part,
- a spring device for applying a force to the actuating arm assembly, the spring device being connected to the actuating arm assembly via at least one engagement location,
- a transmission mechanism for transmitting a force of the spring device to the actuating arm assembly,
- an adjustment device comprising at least one rotatably-supported adjustment element, and a relative position of the at least one engagement location to the actuating arm assembly can be adjusted by a rotation of the adjustment element.

Moreover, the invention relates to an item of furniture comprising a furniture carcass, a furniture part movably-supported relative to the furniture carcass, and a furniture drive of the type to be described for moving the movable furniture part.

The carrier of such furniture drives is usually fixed to or within a sidewall of the furniture carcass. The actuating arm assembly of the furniture drive is pre-stressed by at least one spring device, and is connected to the movable furniture part in a mounted condition.

EP 3 708 753 A1 discloses a non-generic furniture drive for moving a furniture flap, in which a helical spring is provided for compensating for a weight of the furniture flap. By the adjustment of a counter-bearing, the helical spring can be variably compressed so as to adapt the force of the helical spring to different weights of the furniture flaps. The furniture drive further includes a torque limiting device in order to prevent a jamming between the counter-bearing and an end stop. By rotating a drive element with the aid of a tool, the counter-bearing is adjustable. The torque limiting device limits the torque in a first rotational direction of the drive element so as to prevent a jamming between the counter-bearing with the end stop. In a second rotational direction of the drive element, in contrast, the torque is fully transmitted.

CN 106175199 A discloses a furniture drive in which the force of the spring device can be transmitted via a double-armed deflection lever to the actuating arm for moving the furniture flap.

WO 2018/192819 A1 discloses a furniture drive with the features as recited in the preamble of claim 1. A rotatable tool receiver is arranged on a front-end region of the housing of the furniture drive, and a spindle nut is movable along the spindle by rotating the tool receiver with the aid of a tool. A spring assembly is supported on the spindle nut, and a force of the spring assembly acting on the actuating arm assembly can be varied due to the adjustable support of the spindle nut along the spindle.

The adjustment device of a furniture drive for adjusting a force of the spring device acting on the actuating arm assembly can be usually actuated by a rotational tool, for example a screwdriver. With untrained and/or clumsy assembling staff, it may occur that an engagement location of the spring device, due to a rotation of the rotational tool with a high torque, is pressed into an end position and gets jammed there due to the excessive force exertion. This jamming can often be only released with large effort, and damages of the components of the furniture drive cannot be excluded.

With large adjustments paths, the assembling person also tends to actuate the adjustment device with the aid of an electric screwdriver. Therefore, the risk of a damage of the furniture drive is additionally increased.

SUMMARY OF THE INVENTION

It is an object of the present invention to provide a furniture drive of the type mentioned in the introductory part, thereby avoiding the above-discussed drawbacks.

According to the invention, the furniture drive includes at least one overload safety device configured to couple the adjustment element with the transmission mechanism upon a rotation of the adjustment element with a torque below a predetermined torque, and is configured to decouple the adjustment element from the transmission mechanism upon a rotation of the adjustment element with a torque above the predetermined torque.

By the proposed overload safety device, a damage-free actuation of the adjustment device, in particular in the event of a faulty operation by an operator, can be made possible. When a predetermined torque exerted to the adjustment element is exceeded, the adjustment element and the engagement location of the spring device can be decoupled from each other by virtue of the overload safety device.

According to possible embodiments, the overload safety device:—

- includes at least one spring element, preferably a compression spring, and a rotatably supported shaft and the adjustment element can be pressed against each other by a force of the spring element, and/or
- includes at least one tooth arrangement, preferably a spur gearing, arranged on the adjustment element, and/or
- includes at least one rotatably supported shaft configured to be driven by the adjustment element, the adjustment element being coupled to the shaft upon a rotation of the adjustment element with a torque below a predetermined torque, and being decoupled from the shaft upon a rotation of the adjustment element with a torque above the predetermined torque, and/or
- includes at least one rotatable shaft having a longitudinal direction, and the shaft is displaceable in the longitudinal direction of the shaft against a force of a spring element upon a rotation of the adjustment element with a torque above the predetermined torque, and/or
- includes at least one rotatable shaft having a first tooth arrangement configured to be engaged with a second tooth arrangement of the adjustment element, and/or
- includes at least one spring element having an aperture, and the at least one spring element and the adjustment element are arranged to each other such that the adjustment element can be accessed via the aperture of the at least one spring element, and/or
- includes at least one bearing device, and the adjustment element and/or a possibly provided rotatable shaft is or are rotationally arranged in or on the bearing device.

Due to the spring element for applying a force to the at least one shaft, a defined release force and thus a defined switching behavior of the overload safety device can be provided, the spring element being separate from the spring device.

BRIEF DESCRIPTION OF THE DRAWINGS

Further details and advantages of the present invention will be explained with the aid of the following description of figures, in which.

DETAILED DESCRIPTION OF THE INVENTION

Figure 1A:
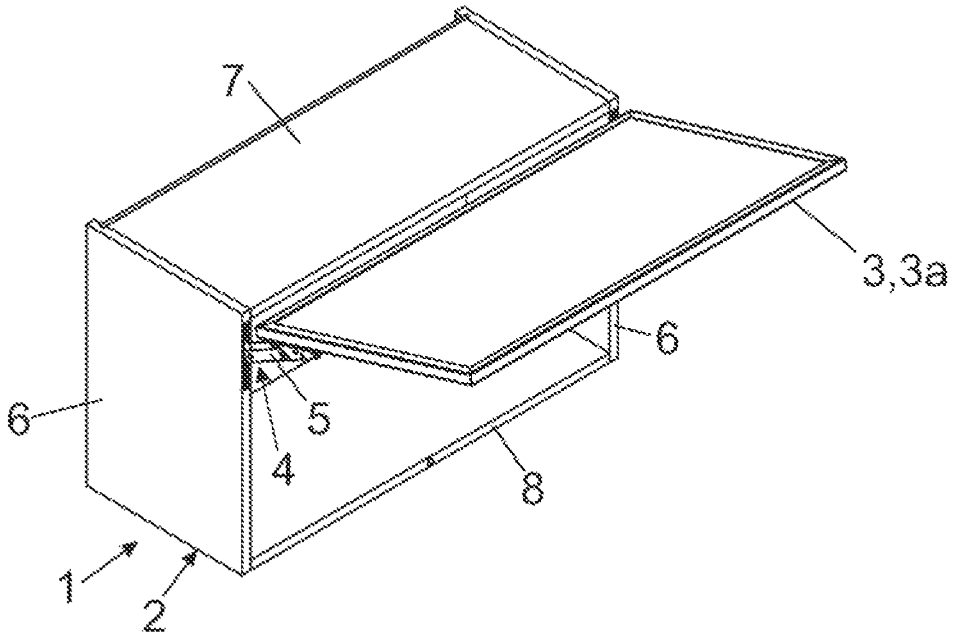
FIG. 1*a*, 1*b* show an item of furniture with a movable furniture part in a perspective view and in an exploded view.

FIG. 1*a* shows a perspective view of an item of furniture 1 comprising a furniture carcass 2, a furniture part 3 movably supported relative to the furniture carcass 2, and at least one furniture drive 4 for moving the movable furniture part 3. The item of furniture 1 includes furniture panels 6 in the form of sidewalls, a top panel 7 and a bottom panel 8. In the shown embodiment, the furniture part 3 is configured as a furniture flap 3*a* configured to be lifted relative to the furniture carcass 2.

In the shown embodiment, the furniture drive 4 is at least partially, preferably substantially entirely, integrated into a furniture panel 6 of the furniture carcass 2. Of course, the furniture drive 4 can also be arranged outside a wall thickness of the furniture panel 6.

The movable furniture part 3 is movably supported between a closed position in which the furniture carcass 2 is covered, and an elevated open position relative to the furniture carcass 2.

Of course, it is also possible to integrate the furniture drive 4 into a horizontally extending furniture panel, thus within the top panel 7, within the bottom panel 8 and/or within a shelf board arranged between the top panel 7 and the bottom panel 8. In such a case, the movable furniture part 3 is pivotally supported relative to the furniture carcass 2 about a vertically extending axis in the mounted position.

The furniture drive 4 includes an actuating arm assembly 5 for moving the movable furniture part 3, and at least one spring device 10 (FIG. 1*b*) for applying a force to the actuating arm assembly 5.

Figure 1B:
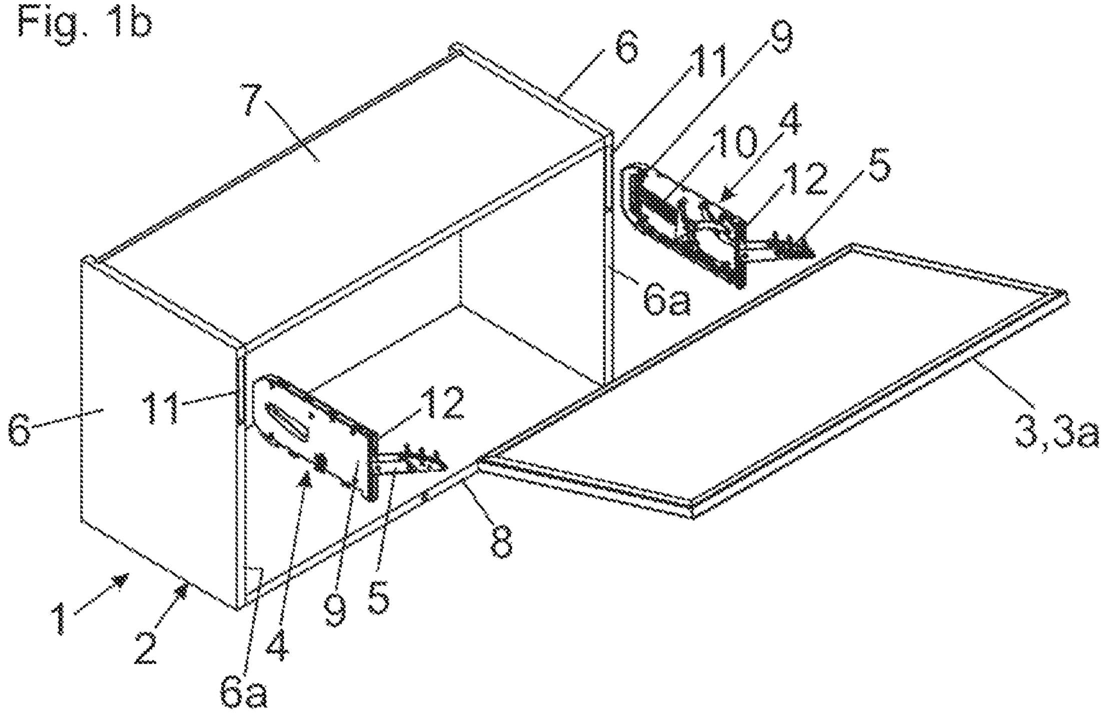

FIG. 1*b* shows the item of furniture 1 in an exploded view, in which two furniture drives 4, preferably identical in construction, are provided for moving the movable furniture part 3.

Each of the furniture drives 4 includes a carrier 9 configured to be fixed to the furniture carcass 2.

According to an embodiment, it can be provided that the carrier 9, in a mounted condition, is at least partially, preferably substantially entirely, received within a recess 11 of the furniture panels 6 configured as sidewalls. In a mounted condition, the carrier 9 can be arranged substantially flush with a front face 6*a* of the furniture panel 6.

The recess 11 can be, for example, in the form of a blind hole. The carrier 9, during the mounting operation, can be inserted from the front (that is to say from the narrow front face 6*a* of the furniture panel 6) into the pocket-shaped recess 11 of the furniture panel 6.

A cover 12 is provided on the front-end region of the carrier 9. At least one movably supported actuating arm 5*a*, 5*b*, 5*c*, 5*d*, 5*e* (FIG. 2*a*) of the actuating arm assembly 5 can be guided through the cover 12 in a relative position.

Figure 2A:
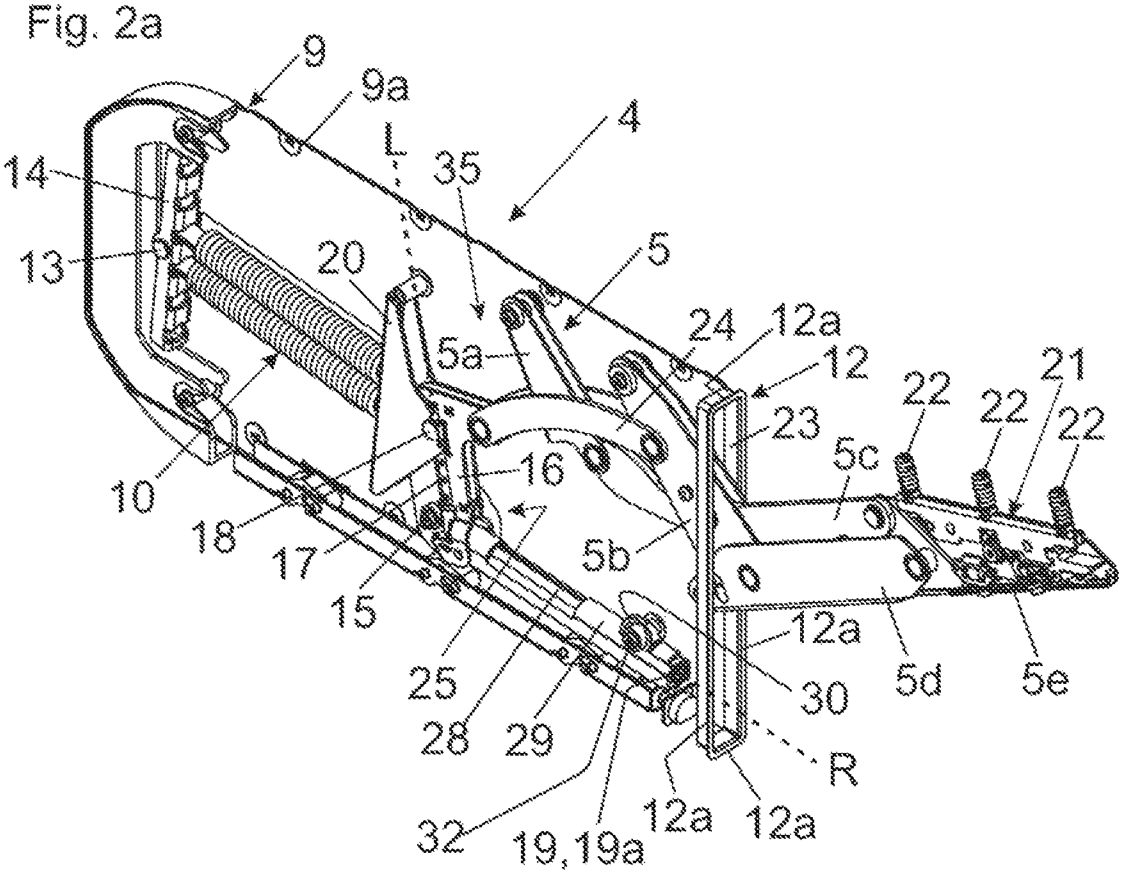
FIG. 2*a*, 2*b* show two different perspective views of a furniture drive.

FIG. 2*a* shows the furniture drive 4 in a perspective view, in which the carrier 9 includes at least one flat-shaped housing wall 9*a* configured to bear against the furniture carcass 2. A pivotable bearing member 14 is provided on the housing wall 9*a*, the bearing member 14 being pivotally supported about a hinge axis 13 stationarily arranged on the carrier 9. The spring device 10 can thus be supported with a first end region on the stationary hinge axis 13. The spring device 10 can include at least one helical spring, preferably at least one compression spring. As an alternative, the spring device 10 can include a gas pressure spring.

The furniture drive 4 includes a transmission mechanism 35 for transmitting a force of the spring device 10 to the actuating arm assembly 5.

In the shown embodiment, a second end portion of the spring device 10 operates onto a pressure portion 20. The pressure portion 20 is hingedly connected to an intermediate lever 16 via an adjustable engagement location 18, the intermediate lever 16 being pivotable about a, preferably stationary, hinge axis 15.

By an adjustment device 19, a force of the spring device 10 to the actuating arm assembly is adjustable. The adjustment device 19 includes an adjustment element 19*a* rotatable about the rotational axis (R), and a position of the engagement location 18 of the spring device 10 relative to the actuating arm assembly 5 can be adjusted, preferably along a threaded portion 17, by rotating the adjustment element 19*a* about the rotational axis (R).

The threaded portion 17 has a longitudinal direction (L). The angle, that the longitudinal direction (L) of the threaded portion 17 and the rotational axis (R) of the adjustment element 19*a* enclose to each other, can be varied upon a movement of the actuating arm assembly 5. By an angularly-movable coupling device 25, a rotational movement of the adjustment element 19*a* can be transmitted to the threaded portion 17. Therefore, the threaded portion 17 can be set into a rotational movement, and thus the engagement location 18 is movable along the threaded portion 17.

The angularly-movable coupling device 25 can include at least one elastic element, preferably a folding bellows, a rubber form element, a coil-spring coupling, and/or at least one gear, preferably a bevel gear transmission, and/or a joint, preferably a cross-joint or a cardan joint.

Preferably, it can be provided that the adjustment element 19*a* of the adjustment device 19, in a mounted condition of the furniture drive 4, faces towards the movable furniture part 3 and is arranged on a front-end region of the carrier 9. In this way, the adjustment element 19*a* can be comfortably actuated from the front with the aid of a tool.

In the shown embodiment, at least one shaft 28 for driving the threaded portion 17 is provided, the at least one shaft 28 being configured to be driven by the adjustment element 19*a*. The at least one shaft 28 is displaceably supported relative to the carrier 9 in or along a guide 30, preferably an elongated hole. In this way, compensation movements of components of the furniture drive 4, caused by the angularly-movable coupling device 25, can be at least partially compensated for.

The shaft 28 is arranged in or on a bearing device 29. The guide 30 is arranged on the bearing device 29 and a pin 32 stationarily supported on the carrier 9 engages into the guide of the bearing device 29. Upon a compensation movement, the bearing device 29 is movable relative to the stationary pin 32.

The actuating arm assembly 5 includes at least one, preferably a plurality of, actuating arm(s) 5*a*, 5*b*, 5*c*, 5*d*, 5*e* for moving the movable furniture part 3. A fitting portion 21 is to be fixed to the movable furniture part 3, the fitting portion 21 having at least one or a plurality of fastening locations 22 and is configured to be releasably locked to an actuating arm 5*e* of the actuating arm assembly 5. In FIG. 2*a*, the locked condition between the actuating arm 5*e* and the fitting portion 21 is shown.

A cover 12 is provided on the front-end of the housing wall 9*a*, the cover 12 having at least one laterally protruding flange 12*a*. In the shown embodiment, the flange 12*a* is configured substantially ring-shaped and forms a depth stop for the carrier 9, the flange 12*a* being configured to bear against the front face 6*a* of the furniture panel 6.

Figure 2B:
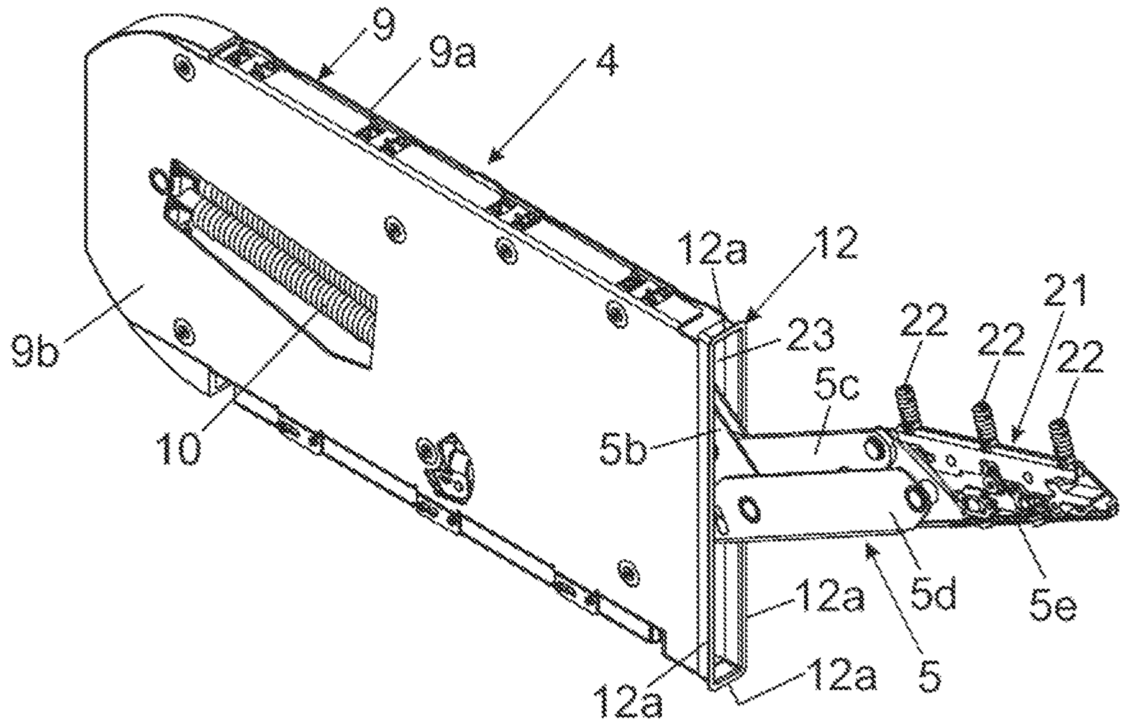

FIG. 2*b* shows the furniture drive 4 according to FIG. 2*a*, in which the carrier 9 is closed by a second housing wall 9*b*. The first housing wall 9*a* and the second housing wall 9*b* are each configured to be flat, are configured to bear against a furniture carcass 2 and jointly form a substantially cuboidal carrier 9. The housing walls 9*a*, 9*b* are mutually spaced apart from each other in a parallel relationship, and a front-sided opening 23 is formed between the housing walls 9*a*, 9*b*. The cover 12 is arranged adjacent to the opening 23 and allows the passage of a screwdriver in order to actuate the adjustment device 19.

Figure 3A:
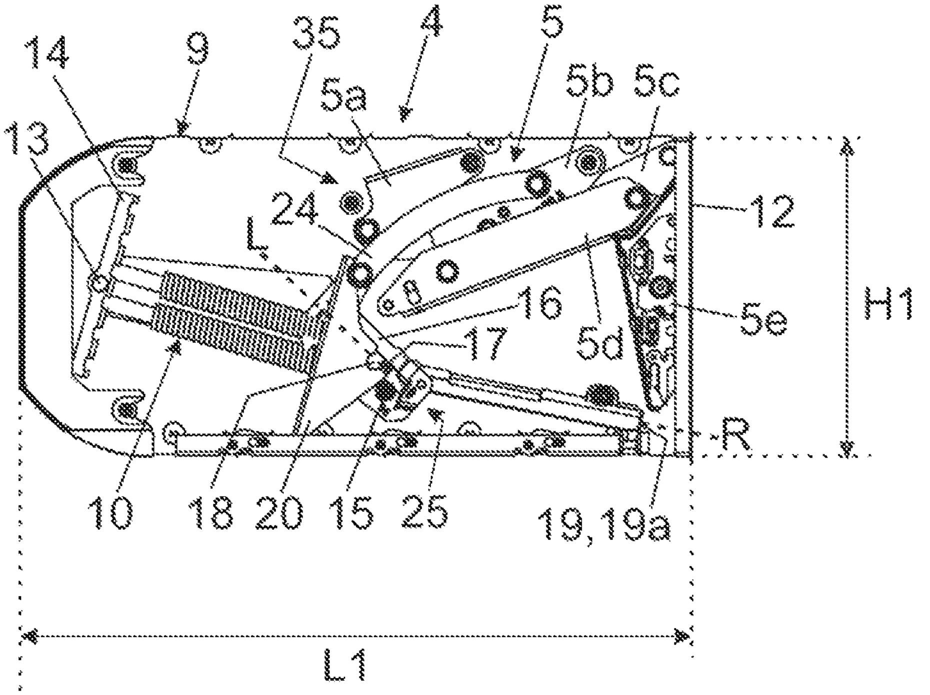
FIG. 3*a*, 3*b* show the furniture drive in a closed position and in an open position.

FIG. 3*a* shows the furniture drive 4 with the carrier 9 in a side view. The threaded portion 17 is arranged on an intermediate lever 16, the intermediate lever 16 being pivotally supported about a stationary hinge axis 15 on the carrier 9. In the shown figure, the spring device 10 applies a minimum torque to the actuating arm assembly 5, because the engagement location 18 of the spring device 10 is located adjacent to the hinge axis 15 of the intermediate lever 16. A notional connecting line between the hinge axis 15 of the intermediate lever 16 and the engagement location 18 of the spring device 10 forms a relatively short lever arm. Therefore, a minimum torque acts onto the actuating arm assembly 5.

The rotational axis (R) of the adjustment element 19*a* of the adjustment device 19 and the longitudinal direction (L) of the threaded portion 17 enclose an angle relative to each other, the angle being variable upon a movement of the actuating arm assembly 5. An advantage of this construction can be seen with the aid of FIG. 3*a*, because in the shown closed position of the furniture drive 4, due to the angularly-movable arrangement of the rotational axis (R) and the longitudinal direction (L), the actuating arms 5*a*-5*e* of the actuating arm assembly 5, jointly with the spring device 10 and the adjustment device 19, can achieve a very compact position to each other.

The adjustment element 19*a* and the rotatable threaded portion 17 are thus angularly-movably supported relative to each other upon a movement of the actuating arm assembly 5. As a result, the adjustment device 19 for adjusting a force of the spring device 10 and the actuating arm assembly 5 can achieve different positions to each other. In this way, the components of the furniture drive 4 can be nested into each other and, therefore, can be arranged tighter to each other. As a result, the furniture drive 4 can be designed in a more compact manner, the adjustment path of the spring device 10 on the threaded portion 17 can be increased, and higher performance ranges of the furniture drive 4 can be covered.

The carrier 9 can be configured substantially rectangular, and it can be preferably provided that a ratio of a length (L1) of the carrier 9 to a height (H1) of the carrier 9 is larger than 1 to 0.7, preferably larger than 1 to 0.5. By such a dimensioning, a reduced height (H1) of the carrier 9 can be provided. In this way, the height of the recess 11 (FIG. 1*b*) of the furniture panel 6 can also be dimensioned small, and the manufacturing efforts of the recess 11 and a weakening of the furniture panel 6 are minor.

Figure 3B:
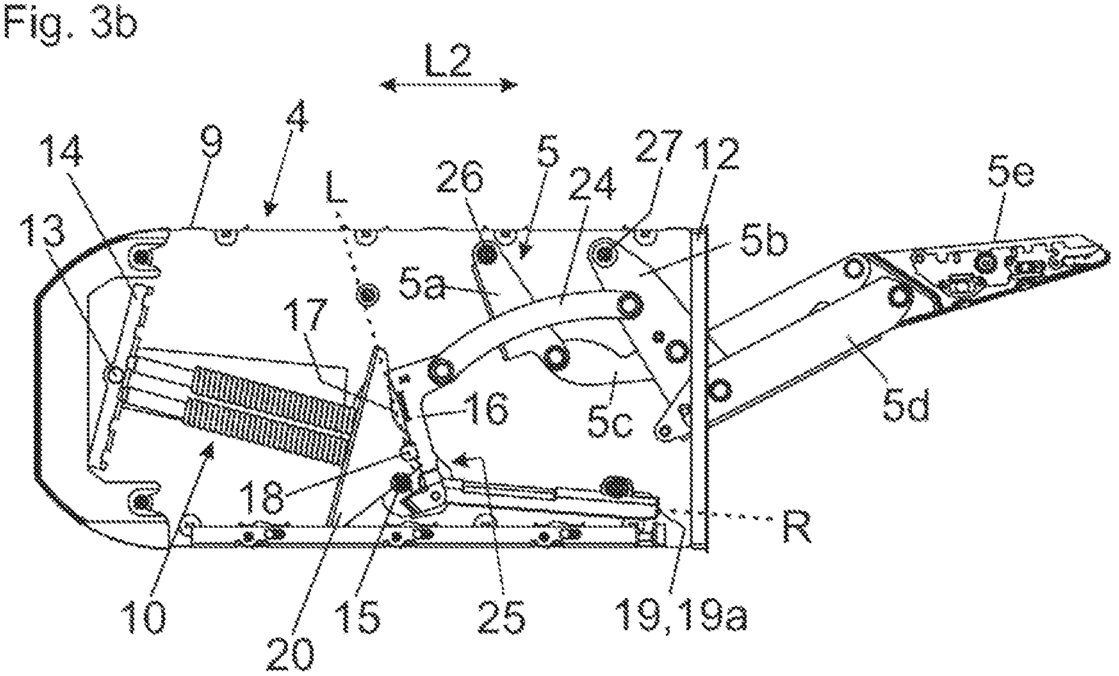

FIG. 3*b* shows the furniture drive 4 according to FIG. 3*a* with a minimum force adjustment of the spring device 10, and in which the actuating arm assembly 5 with the actuating arms 5*a*-5*e* is located in an open position. It can be seen that the angle, that the rotational axis (R) of the adjustment element 9 and the longitudinal direction (L) of the threaded portion 17 enclose to each other, has been decreased compared to the closed position shown in FIG. 3*a*.

The actuating arm assembly 5 includes a first actuating arm 5*a* pivotable about a first hinge axis 26, and at least one second actuating arm 5*b* pivotable about a second hinge axis 27. The first hinge axis 26 and the second hinge axis 27 are mutually spaced apart from each other in a longitudinal direction (L2) of the carrier 9. The second hinge axis 27, in relation to the first hinge axis 26, is arranged in a front region of the carrier 9.

The intermediate lever 16 is directly connected to the second (front) actuating arm 5*b* via a, preferably curved-shaped, pushing lever 24. The first actuating arm 5*a* is thus not directly connected to the pushing lever 24 via a hinge axis. Instead, the first actuating arm 5*a* is displaceably guided within the pushing lever 24. This can be well seen in FIG. 2*a*. In this way, an improved and direct introduction of the force of the spring device 10 into the actuating arm assembly 5 can be provided.

Figure 4A:
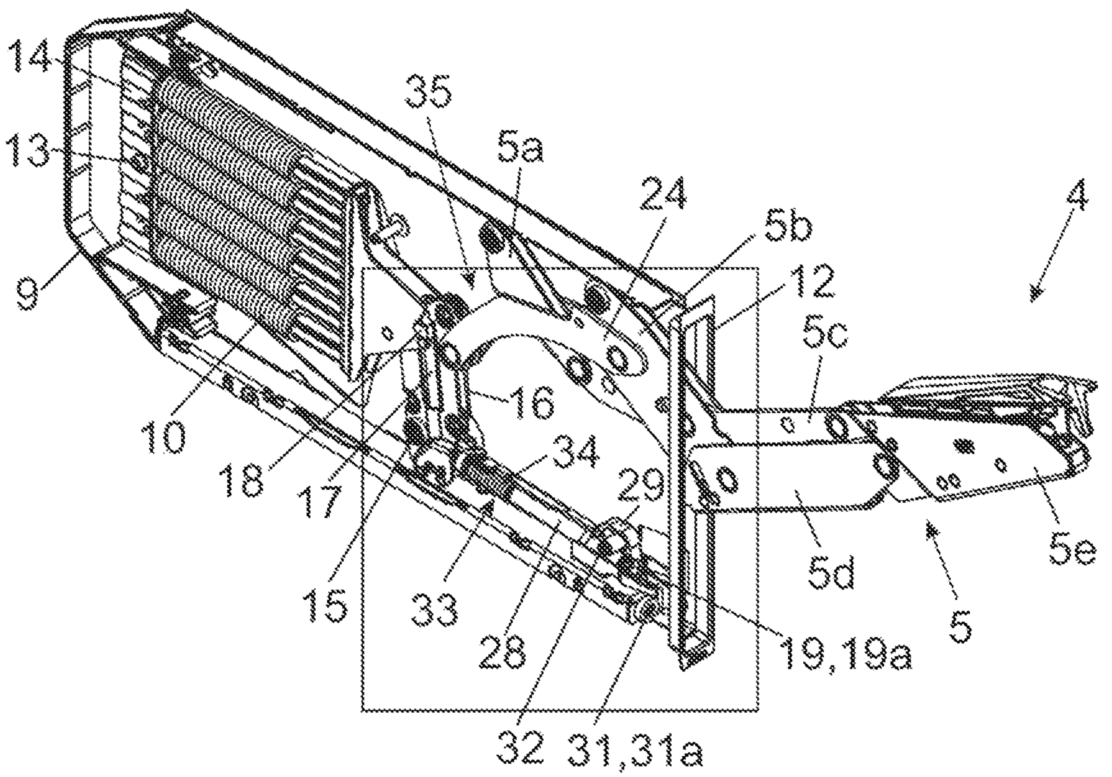
FIG. 4*a*, 4*b* show the furniture drive in a perspective view, and an enlarged detail view thereof.

FIG. 4*a* shows the furniture drive 4 in a perspective view. The furniture drive 4 includes an overload safety device 33 for limiting a maximum torque between the adjustment element 19*a* of the adjustment device 19 and the engagement location 18 of the spring device 10.

The overload safety device 33 is configured such that the overload safety device 33 is configured to couple the adjustment element 19*a* with the transmission mechanism 35 upon a rotation of the adjustment element 19*a* with a torque below a predetermined torque, and is configured to decouple the adjustment element 19*a* from the transmission mechanism 35 upon a rotation of the adjustment element 19*a* with a torque above the predetermined torque.

In the shown embodiment, the overload safety device 33 includes at least one spring element 34, for example in the form of a compression spring. The shaft 28 can be pressed against the adjustment element 19*a* of the adjustment device 19 by a force of the spring element 34. Preferably, it can be provided that the shaft 28 can be pressed against the adjustment element 19*a* of the adjustment device 19 in an axial direction of the shaft 28.

Preferably, the rotational axis (R) of the adjustment element 19*a* and the longitudinal direction (L3) of the at least one shaft 28 extend coaxially to each other.

The adjustment element 19*a* and the shaft 28 can be rotationally coupled to each other via co-operating tooth arrangements 37*a*, 37*b* (FIG. 5*a*-5*d*). Upon a rotation of the adjustment element 19*a* with a torque below a predetermined torque, the adjustment element 19*a* is coupled to the shaft 28. Upon a rotation of the adjustment element 19*a* with a torque above a predetermined torque, the adjustment element 19*a* is decoupled from the transmission mechanism 35. Upon exceeding a torque applied to the adjustment element 19*a*, the spring element 34 is thus compressed, and the adjustment element 19*a* and the shaft 28 can be decoupled from each other.

Figure 4B:
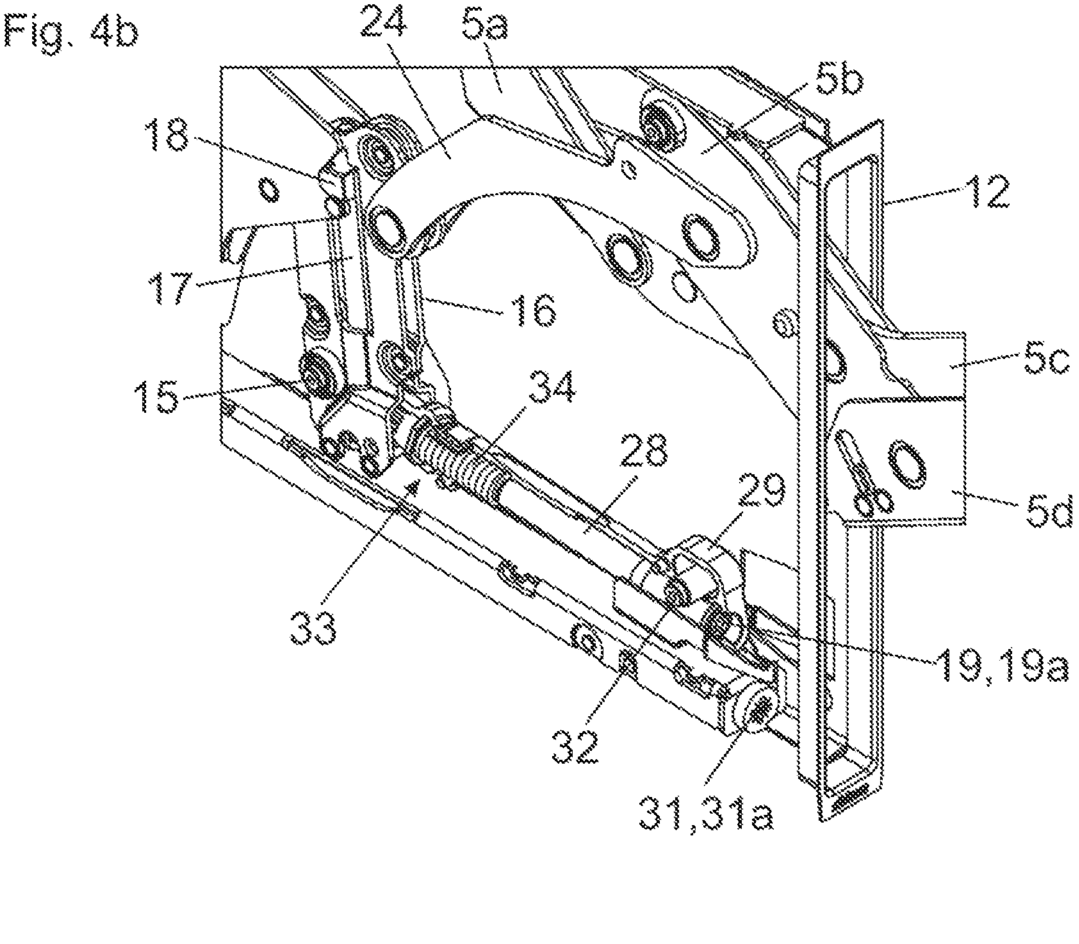

FIG. 4*b* shows the framed region of FIG. 4*a* in an enlarged view. By a fastening device 31 with at least one rotatable tensioning element 31*a*, the carrier 9 of the furniture drive 4 can be clampingly fixed within the recess 11 (FIG. 1*b*) of the furniture panel 6.

Figure 5A:
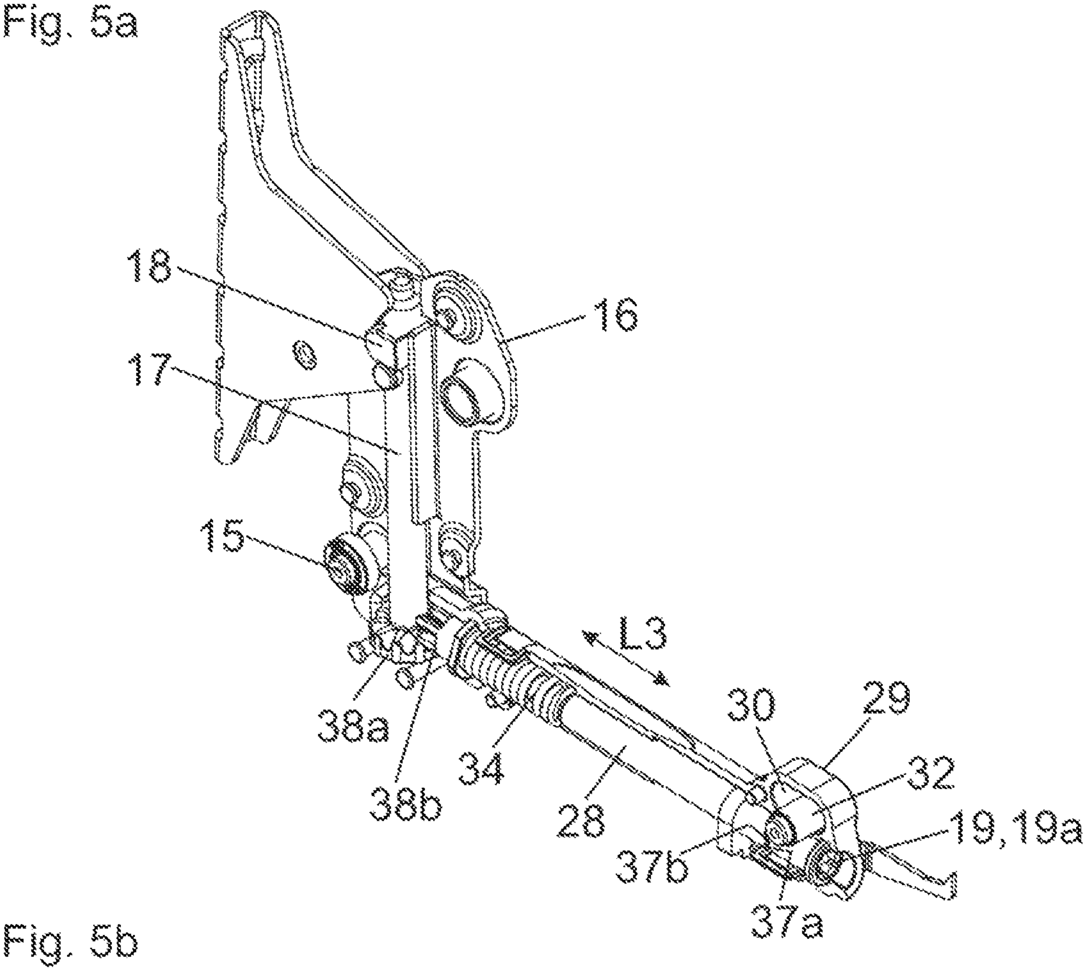
FIG. 5*a*-5*d* show the adjustment device in different views, the adjustment device acting onto the engagement location.

FIG. 5*a* shows a perspective view of the adjustment device 19 for adjusting a position of the engagement location 18 of the spring device 10. The rotatable adjustment element 19*a* can include a receiving device 39 (FIG. 6*b*) for receiving a tool, preferably a screwdriver. The engagement location 18 can be adjusted, preferably along the threaded portion 17, by rotating the receiving device 39 with the aid of the tool.

The adjustment element 19*a* and/or the shaft 28 are rotationally supported on a bearing device 29. The bearing device 29 includes the already described guide 30 in which the pin 32 of the carrier 9 is guided with clearance.

According to possible embodiments of the invention, the overload safety device 33:

- includes at least one spring element 34, preferably a compression spring, and a rotatably supported shaft 28 and the adjustment element 19*a* can be pressed against each other by a force of the spring element 34, and/or
- includes at least one tooth arrangement 37*a*, preferably a spur gearing, arranged on the adjustment element 19*a*,
- includes at least one rotatably supported shaft 28 configured to be driven by the adjustment element 19*a*, the adjustment element 19*a* being coupled to the shaft 28 upon a rotation of the adjustment element 19*a* with a torque below a predetermined torque, and being decoupled from the shaft 28 upon a rotation of the adjustment element 19*a* with a torque above the predetermined torque, and/or
- includes at least one rotatable shaft 28 having a longitudinal direction (L3), and the shaft 28 is displaceable in the longitudinal direction (L3) of the shaft 28 against a force of a spring element 34 upon a rotation of the adjustment element 19*a* with a torque above the predetermined torque, and/or
- includes at least one rotatable shaft 28 having a first tooth arrangement 37*b* configured to be engaged with a second tooth arrangement 37*a* of the adjustment element 19*a*, and/or
- includes at least one bearing device 29, and the adjustment element 19*a* and/or a possibly provided shaft 28 is or are rotationally arranged in or on the bearing device 29.

For example, the shaft 28 can be coupled to the engagement location 18 via co-operating tooth arrangements 38*a*, 38*b*, preferably a bevel gear transmission and preferably via a threaded portion 17.

Figure 5B:
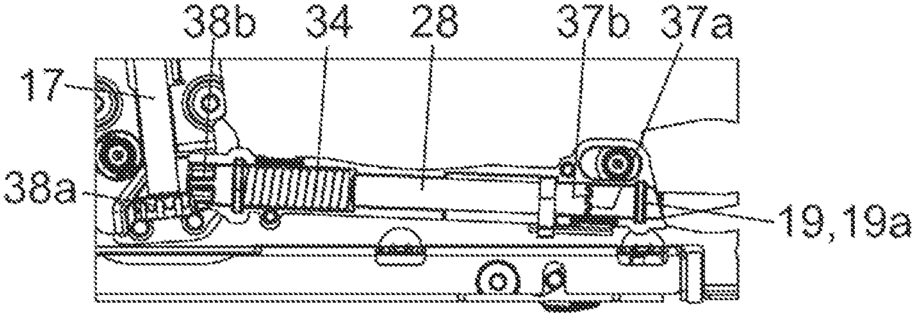

FIG. 5*b* shows the coupled condition between the adjustment element 19*a* and the shaft 28, in which the co-operating tooth arrangements 37*a*, 37*b* are engaged with each other. This is the case when the adjustment element 19*a* is rotated with a torque below a predetermined torque.

Figure 5C:
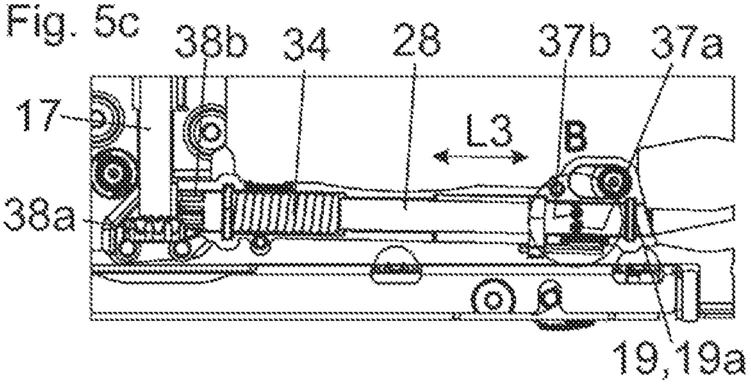

FIG. 5*c* shows the overload case, when the adjustment element 19*a* is rotated with a torque above a predetermined torque. Upon exceeding a critical torque, the adjustment element 19*a* and the shaft 28 are rotated relative to each other. The adjustment element 19*a* and the shaft 28 are axially spaced from each other due to the co-operating tooth arrangements 37*a*, 37*b*, and the spring element 34 is compressed. In this way, the shaft 28 can be decoupled from a rotational movement of the adjustment element 19*a*.

Figure 5D:
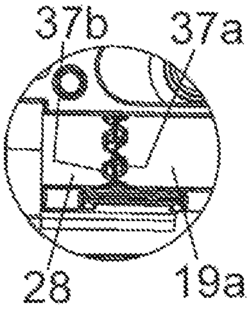

FIG. 5*d* shows the encircled region of FIG. 5*c* in an enlarged view, in which the tooth arrangement 37*a* of the adjustment element 19*a* and the tooth arrangement 37*b* of the shaft 28 are disengaged from each other. This situation corresponds to the overload case, in which the shaft 28 is decoupled from a rotational movement of the adjustment element 19*a*.

Figure 6A:
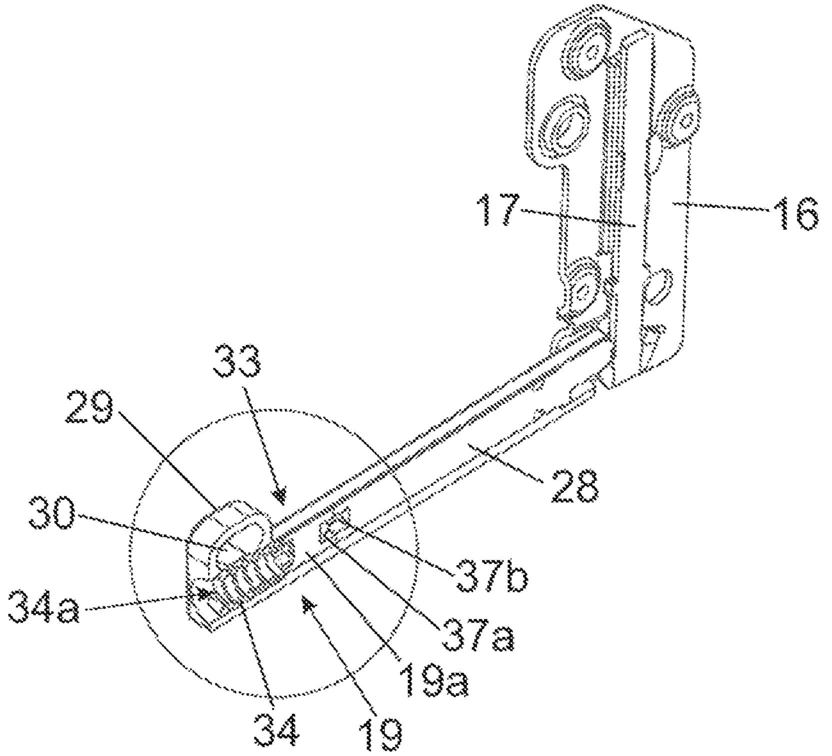
FIG. 6*a*, 6*b* show the adjustment device in a slightly modified embodiment in a perspective view and an enlarged detail view thereof, the adjustment device acting onto the engagement location.

FIG. 6*a* shows a slightly modified embodiment of the adjustment device 19 operating onto the engagement location 18. The adjustment element 19*a* and the shaft 28 are rotationally received within the bearing device 29, and are pressed against each other by a force of the spring element 34 in the form of the compression spring.

The spring element 34 forms an aperture 34*a*, and the spring element 34 and the adjustment element 19*a* are arranged relative to each other such that the adjustment element 19*a* can be accessed via the aperture 34*a* of the spring element 34.

When a torque acting onto the adjustment element 19*a* is exceeded, the tooth arrangements 37*a*, 37*b* can be lifted from each other, after the force of the spring element 34 has been overcome, and the spring element 34 is compressed. When the adjustment element 19*a* is again rotated with a torque below a predetermined torque, the adjustment element 19*a* is again rotationally coupled to the shaft 28 by the force of the spring element 34.

Figure 6B:
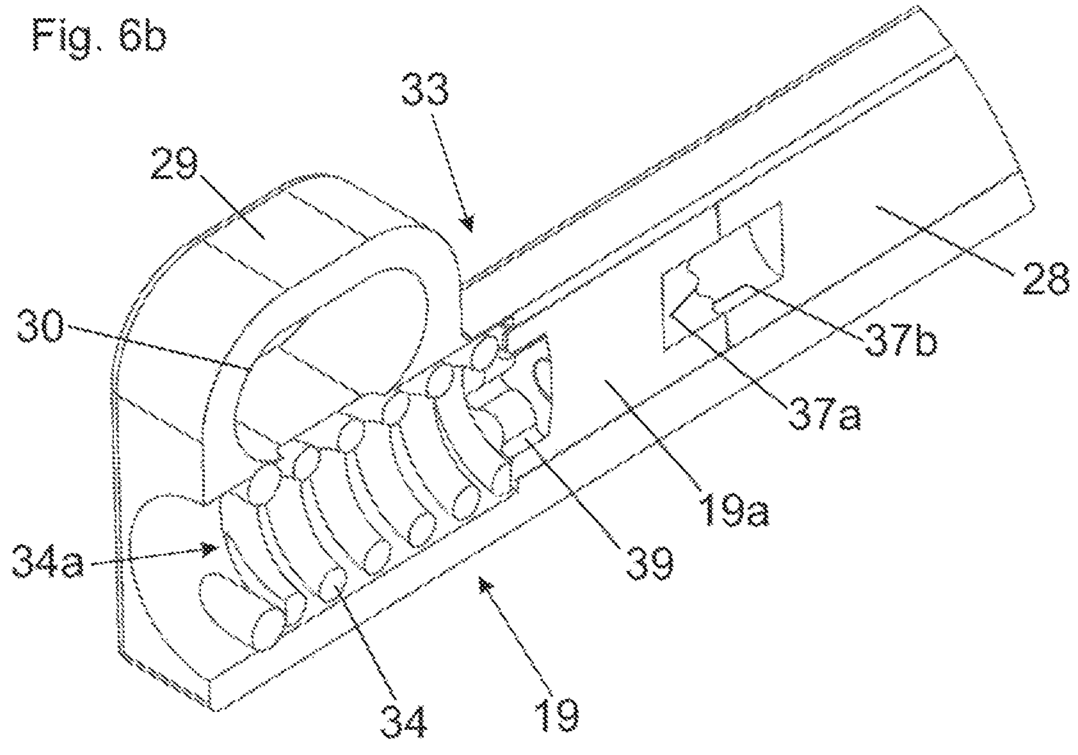

FIG. 6*b* shows the framed region of FIG. 6*a* in an enlarged view. The adjustment element 19*a* of the adjustment device 19 includes a receiving device 39 for a tool, preferably a screwdriver or an electric screwdriver.

For example, the receiving device 39 can include a cross-head form (for example a Pozidriv-profile), a square profile, a hexagonal profile or a six-lobe drive (for example a Torx-profile) so as to establish a reliable form-locking connection for transmitting a torque between the tool and the adjustment element 19*a*.

The furniture drive 4 can include at least one damping device, for example a hydraulic piston-cylinder-unit, for dampening a movement of the actuating arm assembly 5. In this way, a movement of the furniture part 3 into the closed and/or into the open end position can be dampened.

The invention claimed is:

1. A furniture drive for moving a furniture part movably-supported relative to a furniture carcass, the furniture drive comprising:

a carrier configured to be fixed to a furniture carcass;

an actuating arm assembly arranged on the carrier, the actuating arm assembly including at least one movably-supported actuating arm for moving the movable furniture part;

a spring device for applying a force to the actuating arm assembly, the spring device being connected to the actuating arm assembly via at least one engagement location;

a transmission connected to the spring device and to the actuating arm assembly, the transmission being configured to transmit a force of the spring device to the actuating arm assembly;

an adjustment device comprising a rotatably-supported adjustment element, wherein a position of the at least one engagement location relative to the actuating arm assembly can be adjusted by a rotation of the adjustment element; and at least one overload safety device configured to rotationally couple the adjustment element with the transmission upon a rotation of the adjustment element with a torque below a predetermined torque, and configured to rotationally decouple the adjustment element from the transmission upon a rotation of the adjustment element with a torque above the predetermined torque, wherein the at least one engagement location engages on an intermediate lever of the furniture drive, the intermediate lever being pivotably supported on the carrier, and wherein the at least one movably-supported actuating arm includes a first actuating arm pivotable about a first hinge axis, and at least one second actuating arm pivotable about a second hinge axis, wherein the first hinge axis and the second hinge axis are mutually spaced apart from each other in a longitudinal direction of the carrier, the second hinge axis being arranged in a front region of the carrier relative to the first hinge axis, and the intermediate lever is directly connected to the at least one second actuating arm via a pushing lever.

2. The furniture drive according to claim 1, wherein the at least one overload safety device includes at least one rotatably supported shaft.

3. The furniture drive according to claim 1, wherein the at least one overload safety device:

includes at least one tooth arrangement arranged on the adjustment element; or includes at least one spring element having an aperture, and the at least one spring element and the adjustment element are arranged relative to each other such that the adjustment element can be accessed via the aperture of the at least one spring element; or includes at least one bearing device, and the adjustment element or a rotatable shaft is rotationally arranged in or on the at least one bearing device.

4. The furniture drive according to claim 1, further comprising at least one threaded portion having a longitudinal direction, wherein the engagement location of the spring device is adjustable along the at least one threaded portion by a rotation of the adjustment element about a rotational axis.

5. The furniture drive according to claim 4, wherein the rotational axis of the adjustment element and the longitudinal axis of the at least one threaded portion form an angle between each other, and wherein the angle is varied upon a movement of the actuating arm assembly.

6. The furniture drive according to claim 4, further comprising at least one angularly-movable coupling device for transmitting a rotational movement of the adjustment element into a rotational movement of the at least one threaded portion.

7. The furniture drive according to claim 6, wherein the at least one angularly-movable coupling device includes at least one elastic element.

8. The furniture drive according to claim 7, wherein the at least one elastic element comprises a folding bellows, a rubber form element, a coil-spring coupling, at least one gear, or a joint.

9. The furniture drive according to claim 8, wherein the at least one elastic element comprises the at least one gear, and the at least one gear includes a bevel gear transmission, or the at least one elastic element comprises the joint, and the joint is a cross-joint or a cardan joint.

10. The furniture drive according to claim 1, wherein the adjustment element of the adjustment device, in a mounted condition of the furniture drive, faces towards the movable furniture part and is arranged in a front region of the carrier.

11. The furniture drive according to claim 1, wherein the spring device is supported with a first end region on the carrier, and is supported with a second end region on the engagement location.

12. The furniture drive according to claim 1, wherein the spring device includes at least one helical spring.

13. The furniture drive according to claim 12, wherein the at least one helical spring includes at least one compression spring.

14. The furniture drive according to claim 1, wherein the carrier, in a mounted condition on a furniture panel, is configured to be received at least partially within the furniture panel.

15. The furniture drive according to claim 1, wherein the carrier is substantially rectangular.

16. The furniture drive according to claim 15, wherein a ratio of a length of the carrier to a height of the carrier is larger than 1 to 0.7.

17. The furniture drive according to claim 16, wherein the ratio of the length of the carrier to the height of the carrier is larger than 1 to 0.5.

18. The furniture drive according to claim 1, wherein the adjustment element of the adjustment device includes a receiving device for a tool.

19. An item of furniture comprising:

a furniture carcass;

a furniture part movably-supported relative to the furniture carcass; and the furniture drive according to claim 1 for moving the movable furniture part.

20. The item of furniture according to claim 19, wherein the furniture carcass includes a furniture panel for fixing the carrier, and wherein the carrier is at least partially received within a recess of the furniture panel.

21. A furniture drive for moving a furniture part movably-supported relative to a furniture carcass, the furniture drive comprising:

a carrier configured to be fixed to a furniture carcass;

an actuating arm assembly arranged on the carrier, the actuating arm assembly including at least one movably-supported actuating arm for moving the movable furniture part;

a spring device for applying a force to the actuating arm assembly, the spring device being connected to the actuating arm assembly via at least one engagement location;

a transmission connected to the spring device and to the actuating arm assembly, the transmission being configured to transmit a force of the spring device to the actuating arm assembly;

an adjustment device comprising a rotatably-supported adjustment element, wherein a position of the at least one engagement location relative to the actuating arm assembly can be adjusted by a rotation of the adjustment element; and at least one overload safety device configured to rotationally couple the adjustment element with the transmission upon a rotation of the adjustment element with a torque below a predetermined torque, and configured to rotationally decouple the adjustment element from the transmission upon a rotation of the adjustment element with a torque above the predetermined torque, wherein the at least one overload safety device includes at least one rotatably supported shaft, and wherein;

the overload safety device includes a spring element, wherein the at least one rotatably supported shaft and the adjustment element can be pressed against each other by a force of the spring element; or the at least one rotatably supported shaft is configured to be driven by the adjustment element, the adjustment element being coupled to the at least one rotatably supported shaft upon a rotation of the adjustment element with a torque below the predetermined torque, and being decoupled from the at least one rotatably supported shaft upon a rotation of the adjustment element with a torque above the predetermined torque; or the at least one rotatably supported shaft has a longitudinal direction and is displaceable in the longitudinal direction against a force of a spring element upon a rotation of the adjustment element with a torque above the predetermined torque; or the at least one rotatably supported shaft includes a first tooth arrangement configured to be engaged with a second tooth arrangement of the adjustment element.

22. A furniture drive for moving a furniture part movably-supported relative to a furniture carcass, the furniture drive comprising:

a carrier configured to be fixed to a furniture carcass;

an actuating arm assembly arranged on the carrier, the actuating arm assembly including one or more movably-supported actuating arms for moving the movable furniture part;

a spring device for applying a force to the actuating arm assembly, the spring device being connected to the actuating arm assembly via at least one engagement location;

a transmission connected to the spring device and to the actuating arm assembly, the transmission being configured to transmit a force of the spring device to the actuating arm assembly;

an adjustment device comprising a rotatably-supported adjustment element, wherein a position of the at least one engagement location relative to the actuating arm assembly can be adjusted by a rotation of the adjustment element; and at least one overload safety device configured to rotationally couple the adjustment element with the transmission upon a rotation of the adjustment element with a torque below a predetermined torque, and configured to rotationally decouple the adjustment element from the transmission upon a rotation of the adjustment element with a torque above the predetermined torque, wherein the carrier has a front-side opening through which at least one actuating arm of the one or more movably-supported actuating arms can be guided, and wherein the adjustment element is arranged in a front-end region of the carrier such that the adjustment element can be actuated from the front of the carrier with a tool inserted into the front-side opening.

23. A furniture drive for moving a furniture part movably-supported relative to a furniture carcass, the furniture drive comprising:

a carrier configured to be fixed to a furniture carcass;

an actuating arm assembly arranged on the carrier, the actuating arm assembly including at least one movably-supported actuating arm for moving the movable furniture part;

a spring device for applying a force to the actuating arm assembly, the spring device being connected to the actuating arm assembly via at least one engagement location;

a transmission connected to the spring device and to the actuating arm assembly, the transmission being configured to transmit a force of the spring device to the actuating arm assembly;

an adjustment device comprising a rotatably-supported adjustment element, wherein a position of the at least one engagement location relative to the actuating arm assembly can be adjusted by a rotation of the adjustment element; and at least one overload safety device configured to rotationally couple the adjustment element with the transmission upon a rotation of the adjustment element with a torque below a predetermined torque, and configured to rotationally decouple the adjustment element from the transmission upon a rotation of the adjustment element with a torque above the predetermined torque, wherein the at least one overload safety device includes at least one rotatably supported shaft, and wherein a rotational axis of the adjustment element and a longitudinal direction of the at least one rotatably supported shaft extend coaxially to each other.

24. A furniture drive for moving a furniture part movably-supported relative to a furniture carcass, the furniture drive comprising:

a carrier configured to be fixed to a furniture carcass;

an actuating arm assembly arranged on the carrier, the actuating arm assembly including at least one movably-supported actuating arm for moving the movable furniture part;

a spring device for applying a force to the actuating arm assembly, the spring device being connected to the actuating arm assembly via at least one engagement location;

a transmission connected to the spring device and to the actuating arm assembly, the transmission being configured to transmit a force of the spring device to the actuating arm assembly;

an adjustment device comprising a rotatably-supported adjustment element, wherein a position of the at least one engagement location relative to the actuating arm assembly can be adjusted by a rotation of the adjustment element;

at least one overload safety device configured to rotationally couple the adjustment element with the transmission upon a rotation of the adjustment element with a torque below a predetermined torque, and configured to rotationally decouple the adjustment element from the transmission upon a rotation of the adjustment element with a torque above the predetermined torque; and at least one threaded portion having a longitudinal direction, wherein the engagement location of the spring device is adjustable along the at least one threaded portion by a rotation of the adjustment element about a rotational axis, wherein the rotational axis of the adjustment element and a longitudinal axis of the at least one threaded portion form an angle between each other, and wherein the angle is varied upon a movement of the actuating arm assembly.

* * * * *